United States Patent
Xing et al.

(10) Patent No.: US 12,007,140 B2
(45) Date of Patent: Jun. 11, 2024

(54) AIR INTAKE AND EXHAUST ASSEMBLY AND PACKAGED AIR CONDITIONER

(71) Applicant: GD MIDEA AIR-CONDITIONING EQUIPMENT CO., LTD., Foshan (CN)

(72) Inventors: Zhigang Xing, Foshan (CN); Eli Zhao, Foshan (CN)

(73) Assignee: GD MIDEA AIR-CONDITIONING EQUIPMENT CO., LTD., Foshan (CN)

( * ) Notice: Subject to any disclaimer, the term of this patent is extended or adjusted under 35 U.S.C. 154(b) by 422 days.

(21) Appl. No.: 17/430,126

(22) PCT Filed: Apr. 30, 2020

(86) PCT No.: PCT/CN2020/088358
§ 371 (c)(1),
(2) Date: Aug. 11, 2021

(87) PCT Pub. No.: WO2021/179421
PCT Pub. Date: Sep. 16, 2021

(65) Prior Publication Data
US 2022/0307723 A1  Sep. 29, 2022

(30) Foreign Application Priority Data

Mar. 10, 2020 (CN) .......................... 202010161781.8
Mar. 10, 2020 (CN) .......................... 202020288838.6

(51) Int. Cl.
F24F 13/02   (2006.01)
F24F 1/028   (2019.01)
(Continued)

(52) U.S. Cl.
CPC .......... *F24F 13/0281* (2013.01); *F24F 1/028* (2019.02); *F24F 13/30* (2013.01); *F24F 2013/0616* (2013.01)

(58) Field of Classification Search
CPC ........ F24F 13/0281; F24F 1/028; F24F 13/30; F24F 2013/0616
See application file for complete search history.

(56) References Cited

U.S. PATENT DOCUMENTS 3,208,236 A    9/1965  Frigerio
3,712,649 A *  1/1973  Martin ................ F16L 25/0009
                                                  29/513
(Continued)

FOREIGN PATENT DOCUMENTS

CN    2211032 Y     10/1995
CN   204830382 U *  12/2015
(Continued)

OTHER PUBLICATIONS

Hui et al., Exhaust Pipe for Air Purifier, Dec. 2, 2015, CN204830382U, Whole Document.*
(Continued)

*Primary Examiner* — Larry L Furdge
(74) *Attorney, Agent, or Firm* — Anova Law Group, PLLC

(57) ABSTRACT

An air intake and exhaust assembly includes an air exhaust pipe, a connection pipe, and an air intake pipe arranged adjacent to the air exhaust pipe. The air exhaust pipe includes an air exhaust channel formed in the air exhaust pipe. One end of the connection pipe is connected to a lower end of the air exhaust pipe and another end of the connection pipe is configured to be connected to an air exhaust volute of a packaged air conditioner, such that the air exhaust channel is communicated with an air outlet of the air exhaust volute. An air intake channel is formed between an inner (Continued)

wall of the air intake pipe and an outer wall of the air exhaust pipe, and the air intake channel is communicated with an air inlet of the packaged air conditioner.

16 Claims, 4 Drawing Sheets

(51) Int. Cl.
*F24F 13/30* (2006.01)
*F24F 13/06* (2006.01)

(56) References Cited

U.S. PATENT DOCUMENTS

| | | |
|---|---|---|
| 2010/0230078 A1 | 9/2010 | Ku |
| 2016/0185286 A1* | 6/2016 | Cazenave ................ B60Q 3/51 |
| | | 362/511 |

FOREIGN PATENT DOCUMENTS

| | | |
|---|---|---|
| CN | 204830382 U | 12/2015 |
| CN | 209068701 U | 7/2019 |
| CN | 209926557 U | 1/2020 |
| CN | 110822561 A | 2/2020 |
| EP | 1715235 A2 | 10/2006 |
| JP | 2008051498 A | 3/2008 |
| JP | 2009008284 A | 1/2009 |

OTHER PUBLICATIONS

Shen, Air Conditioner, Oct. 25, 1995, CN2211032Y, Whole Document (Year: 1995).*
The European Patent Office (EPO) Extended Search Report for EP Application No. 20914758.6 Mar. 4, 2022 6 Pages.
World Intellectual Property Organization (WIPO) International Search Report and Written Opinion for PCT/CN2020/088358 Dec. 8, 2020 12 Pages (With translation).

* cited by examiner

AIR INTAKE AND EXHAUST ASSEMBLY AND PACKAGED AIR CONDITIONER

CROSS-REFERENCE TO RELATED APPLICATIONS

The present application is a National Stage Entry under 35 U.S.C. § 371 of International Application No. PCT/CN2020/088358, filed on Apr. 30, 2020, which claims priority to Chinese Application No. 202010161781.8, filed on Mar. 10, 2020 and entitled "AIR INTAKE AND EXHAUST ASSEMBLY AND PACKAGED AIR CONDITIONER," and Chinese Application No. 202020288838.6, filed on Mar. 10, 2020 and entitled "AIR INTAKE AND EXHAUST ASSEMBLY AND PACKAGED AIR CONDITIONER," the entire contents of all of which are incorporated herein by reference.

TECHNICAL FIELD

The present disclosure relates to the field of air-conditioning technologies, and more particularly, to an air intake and exhaust assembly and a packaged air conditioner.

BACKGROUND

In the related art, in an existing packaged air conditioner with dual air pipes, the dual air pipes include two independent air pipes, which are respectively used for connecting to an outdoor heat exchanger to realize air intake and connecting to an air exhaust volute to realize air exhaust, such that the packaged air conditioner can exchange heat with an outdoor environment. However, a dual-air-pipe structure is relatively complicated for a user to install, which results in poor user experience and has an unsightly appearance.

SUMMARY

The present disclosure aims at solving at least one of the technical problems in the related art. Therefore, the present disclosure provides an air intake and exhaust assembly, which is simple and convenient to install, aesthetically favorable in appearance, and improves user experience.

The present disclosure further provides a packaged air conditioner, including the air intake and exhaust assembly above.

In accordance with a first aspect of the embodiments of the present disclosure, an air intake and exhaust assembly applied to a packaged air conditioner is provided, including: an air exhaust pipe, including an air exhaust channel in the air exhaust pipe; a connection pipe, where one end of the connection pipe is connected to a lower end of the air exhaust pipe and the other end of the connection pipe is connected to an air exhaust volute of the packaged air conditioner, such that the air exhaust channel is communicated with an air outlet of the air exhaust volute; and an air intake pipe, where the air intake pipe sleeves the air exhaust pipe, an air intake channel is formed between an inner wall of the air intake pipe and an outer wall of the air exhaust pipe, and the air intake channel is communicated with an air inlet of the packaged air conditioner.

The air intake and exhaust assembly according to the embodiments of the present disclosure at least has the following beneficial effects.

A dual-air-pipe structure is formed by arranging an air exhaust pipe and an air intake pipe sleeving the air exhaust pipe in the air intake and exhaust assembly, which is simple and aesthetically favorable in structure, convenient for users to install and adjust the air intake and exhaust assembly, and improves user experience; an air intake channel is formed between the air intake pipe and the air exhaust pipe, such that the air intake channel is communicated with an air inlet of a packaged air conditioner to transfer outdoor air to an outdoor heat exchanger; the air exhaust channel is formed in the air exhaust pipe and connected to an air exhaust volute through a connection pipe, such that an air outlet of the air exhaust volute is communicated with the air exhaust channel to discharge the air after heat exchange outdoors, thereby forming a sealed heat exchange duct and improving the heat exchange effect between the packaged air conditioner and the outdoor environment; and the connection pipe makes connection between the air exhaust pipe and the air exhaust volute more reliable, improves a sealing performance of the air exhaust channel, avoids air crossing between the air intake channel and the air exhaust channel, and improves the energy efficiency of the packaged air conditioner.

In accordance with some embodiments of the present disclosure, one end of the connection pipe facing the air exhaust pipe is provided with a first installation port, and the lower end of the air exhaust pipe is provided with a first joint matching the first installation port.

In accordance with some embodiments of the present disclosure, the first installation port is provided with a plurality of first buckles at intervals along a circumferential direction, and the plurality of first buckles are clamped with the first joint.

In accordance with some embodiments of the present disclosure, the air inlet is provided with a second installation port, and one end of the air intake pipe facing the air inlet is provided with a second joint matching the second installation port.

In accordance with some embodiments of the present disclosure, the second installation port is provided with a plurality of second buckles at intervals along a circumferential direction, and the plurality of second buckles are clamped with the second joint.

In accordance with some embodiments of the present disclosure, the air intake and exhaust assembly further includes a sealing plate, where the sealing plate is provided with an air intake hole, and the air intake hole is connected to one end of the air intake pipe away from the air inlet.

In accordance with some embodiments of the present disclosure, the sealing plate further includes a fixation ring, the fixation ring is arranged in the air intake hole and includes an air exhaust hole, the air exhaust hole is connected to one end of the air exhaust pipe away from the air outlet, and a connection rib is arranged between the fixation ring and the sealing plate.

In accordance with some embodiments of the present disclosure, a plurality of connection ribs are provided, and the plurality of connection ribs are arranged at intervals along a circumferential direction of the fixation ring.

In accordance with some embodiments of the present disclosure, each of the air exhaust pipe, the connection pipe, and the air intake pipe is cylindrical.

In accordance with a second aspect of the embodiments of the present disclosure, a packaged air conditioner is provided, including the air intake and exhaust assembly according to above embodiments.

The packaged air conditioner according to the embodiments of the present disclosure at least has the following beneficial effects.

A dual-air-pipe structure is formed by arranging an air exhaust pipe and an air intake pipe sleeving the air exhaust pipe in the air intake and exhaust assembly, which is simple and aesthetically favorable in structure, convenient for users to install and adjust the air intake and exhaust assembly, and improves user experience; an air intake channel is formed between the air intake pipe and the air exhaust pipe, such that the air intake channel is communicated with an air inlet of a packaged air conditioner to transfer outdoor air to an outdoor heat exchanger; the air exhaust channel is formed in the air exhaust pipe and connected to an air exhaust volute through a connection pipe, such that an air outlet of the air exhaust volute is communicated with the air exhaust channel to discharge the air after heat exchange outdoors, thereby forming a sealed heat exchange duct and improving the heat exchange effect between the packaged air conditioner and the outdoor environment; and the connection pipe makes connection between the air exhaust pipe and the air exhaust volute more reliable, improves a sealing performance of the air exhaust channel, avoids air crossing between the air intake channel and the air exhaust channel, and improves the energy efficiency of the packaged air conditioner.

Additional aspects and advantages of the present disclosure will be explained in part in the following description, which can become apparent from the following description or be understood through practice of the present disclosure.

BRIEF DESCRIPTION OF DRAWINGS

The above and/or additional aspects and advantages of the present disclosure can become apparent and easy to understand from the description of embodiments in conjunction with the following drawings, where.

REFERENCE NUMERALS

Figure 1:
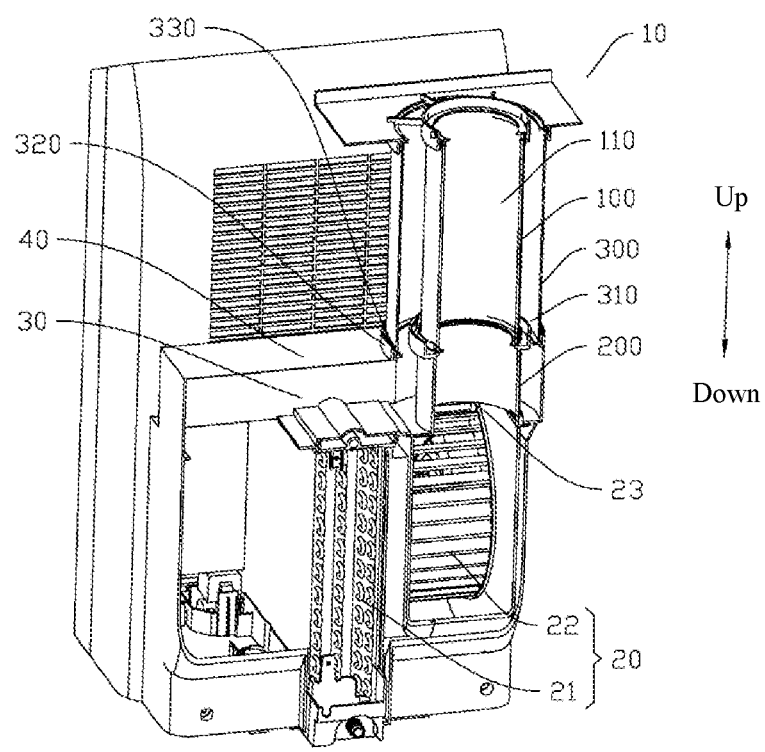
FIG. 1 is a schematic cross-sectional view of a packaged air conditioner according to an embodiment of the present disclosure.

10: air intake and exhaust assembly; 20: outdoor heat exchange assembly; 21: outdoor heat exchanger; 22: air exhaust volute; 23: air outlet; 30: air inlet; 40: rear panel;

100: air exhaust pipe; 110: air exhaust channel; 120: first joint;

200: connection pipe; 210: first installation port; 211: first buckle; 220: flange;

300: air intake pipe; 310: air intake channel; 320: second installation port; 321: second buckle; 330: second joint;

400: sealing plate; 410: air intake hole; 420: fixation ring; 421: air exhaust hole; 430: connection rib.

DETAILED DESCRIPTION

Embodiments of the present disclosure are described below in detail, illustrations of which are shown in the accompanying drawings, where identical or similar reference numerals denote identical or similar elements or elements having the same or similar functions. The embodiments described below by reference to the accompanying drawings are exemplary and are intended only to explain the present disclosure and are not to be construed as limiting the present disclosure.

In the description of the present disclosure, it should be understood that any orientation/position related description, such as the orientational or positional relationship, such as, up, down, left, right, front, rear, and the like is based on the orientational or positional relationship shown in the accompanying drawings, is only for the purpose of facilitating the description of the present disclosure and simplifying the description, and does not indicate or imply that the device or element indicated or implied must have a specific orientation or position, be constructed and operated in a specific azimuth, and therefore shall not be understood as a limitation to the present disclosure.

In the description of the present disclosure, several means one or more, and multiple or plurality means more than two. A description of "first" and "second" are for the purpose of distinguishing the technical features, and shall not be understood as indicating or implying relative importance or implying the number of indicated technical features or implying the order of indicated technical features.

In the description of the present disclosure, words such as setup, installation and connection shall be understood in a broad sense unless otherwise expressly limited, and a person skilled in the art may reasonably determine the specific meaning of the above words in the present disclosure with reference to the context of the technical scheme.

With reference to FIG. 1, an air intake and exhaust assembly 10 according to an embodiment of the present disclosure is applied to a packaged air conditioner employing a dual-air-pipe structure. The air intake and exhaust assembly 10 is connected to an outdoor heat exchange assembly 20 of the packaged air conditioner. The outdoor heat exchange assembly 20 includes an outdoor heat exchanger 21 and an air exhaust volute 22. One of the air pipes of the air intake and exhaust assembly 10 guides outdoor air to enter from an air inlet 30 of the packaged air conditioner. After the air exchanges heat through the outdoor heat exchanger 21, the air exhaust volute 22 discharges the air after heat exchange to outdoors through the other air pipe of the air intake and exhaust assembly 10, thus realizing a heat exchange process of the packaged air conditioner.

Figure 2:
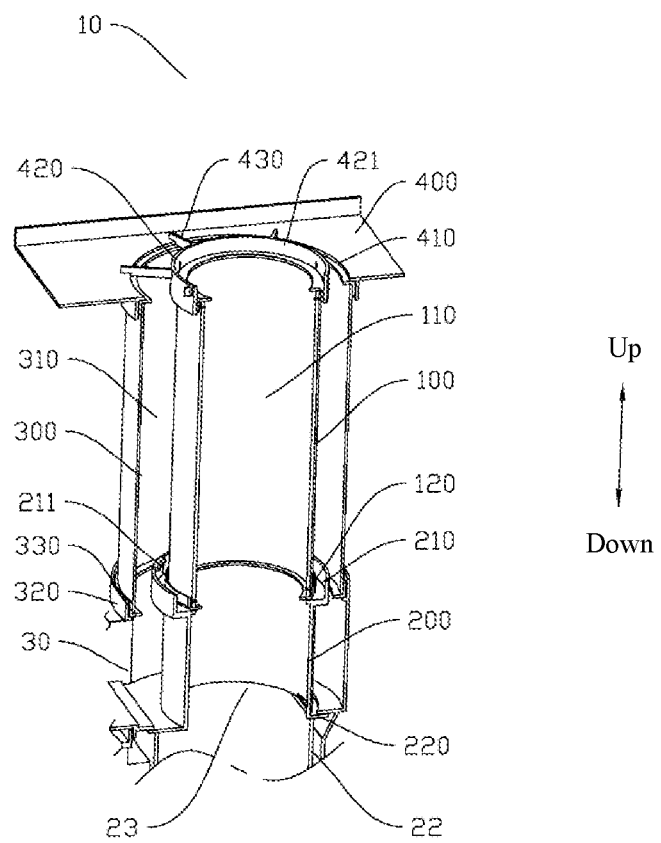
FIG. 2 is a schematic cross-sectional view of an air intake and exhaust assembly in FIG. 1.

With reference to FIG. 1 and FIG. 2, the air intake and exhaust assembly 10 according to the embodiments of the present disclosure includes an air exhaust pipe 100 and a connection pipe 200, where an air exhaust channel 110 is formed in the air exhaust pipe 100, one end of the connection pipe 200 is connected to a lower end of the air exhaust pipe 100 and the other end of the connection pipe is connected to the air exhaust volute 22, such that the air exhaust channel 110 is communicated with an air outlet 23 of the air exhaust volute 22. It should be noted that the connection pipe 200 is connected to the air exhaust pipe 100 and the air exhaust volute to form the sealed air exhaust channel 110, which avoids air leakage on a path of exhausting air of the air exhaust channel 110, and ensures that all the air exhausted from the air outlet 23 of the air exhaust volute 22 can be exhausted outdoors through the air exhaust pipe 100.

With reference to FIG. 1 and FIG. 2, the air intake and exhaust assembly 10 according to the embodiments of the present disclosure also includes an air intake pipe 300, where the air intake pipe 300 sleeves the air exhaust pipe 100, an air intake channel 310 is formed between an inner wall of the air intake pipe 300 and an outer wall of the air exhaust pipe 100, and the air intake channel 310 is communicated with the air inlet 30 of the packaged air conditioner, thus forming the sealed air intake channel 310, such that the air intake channel 310 and the air exhaust channel 110 are isolated from each other, which avoids heat exchange between the air intake channel 310 and the air exhaust channel 110 to affect a heat exchange efficiency of the packaged air conditioner. Moreover, the connection pipe 200 makes connection between the air exhaust pipe 100 and the air exhaust volute more reliable, thus improving a sealing performance of the air exhaust channel 110, and further avoiding air crossing between the intake duct 310 and the exhaust duct 110, thus the air intake channel 310, the outdoor heat exchange assembly 20 and the air exhaust channel 110 are connected to form a sealed heat exchange duct, improving a heat exchange effect between the packaged air conditioner and an outdoor environment, and improving an energy efficiency of the packaged air conditioner. Moreover, the air intake and exhaust assembly is simpler and more convenient to assemble.

It should be further noted that the air intake and exhaust assembly 10 according to the embodiments of the present disclosure forms a dual-air-pipe structure by providing the air exhaust pipe 100 and the air intake pipe 300 sleeving the air exhaust pipe 100. Compared with a dual-air-pipe structure composed of two separate independent air pipes, the air intake and exhaust assembly 10 according to the embodiments of the present disclosure has a simple and aesthetically favorable structure, which is convenient for users to install and adjust the dual-air-pipe structure, and improves user experience. Moreover, the packaged air conditioner employing the dual-air-pipe structure can realize whole house cooling or heating, and improve the heat exchange efficiency of the packaged air conditioner.

With reference to FIG. 2, in some embodiments, one end of the connection pipe 200 facing the air exhaust pipe 100 is provided with a first installation port 210, and the lower end of the air exhaust pipe 100 is provided with a first joint 120 matching the first installation port 210. Specifically, the first joint 120 is installed at the lower end of the air exhaust pipe 100, and the first joint 120 and the first installation port 210 may be fixedly connected by buckle connection, screw connection, etc., which will not be specifically limited here.

In some embodiments, the first installation port 210 is provided with a plurality of first buckles 211 at intervals along a circumferential direction, and the plurality of first buckles 211 are clamped with the first joint 120, which is convenient to install and disassemble and has a stable connection structure by using the clamping manner. It may be understood that a number of the first buckle 211 may be set to be one, two, three or more than three. When the number of the first buckle 211 is set to be multiple, the multiple first buckles 211 are uniformly distributed on the first installation port 210, and the number of the first buckle 211 may be designed according to different sizes of air exhaust pipes 100 adopted by the packaged air conditioner in actual production. In addition, the plurality of first buckles 211 may be designed to be clamped with an outer wall of the first joint 120 (with reference to FIG. 2), and may also be designed to be clamped with an inner wall of the first joint 120, so as to realize sealing assembly of a joint between the air exhaust pipe 100 and the connection pipe 200.

It is also noted that a lower end of the connection pipe 200 is connected to an upper end of the air exhaust volute 22, such that the air outlet 23 of the air exhaust volute 22 is in sealed communication with the air exhaust channel 110, which prevents the air after heat exchange in the air exhaust channel 110 from leaking outside. Specifically, the lower end of the connection pipe 200 is provided with a flange 220 along a circumferential direction, and the flange 220 abuts against the air outlet 23 of the air exhaust volute 22, thereby further avoiding air crossing between the air intake channel 310 and the air exhaust channel 110 at a joint between the connection pipe 200 and the air exhaust volute 22.

With reference to FIG. 1 and FIG. 2, in some embodiments, the air inlet 30 is provided with a second installation port 320, and one end of the air intake pipe 300 facing the air inlet 30 is provided with a second joint 330 matching the second installation port 320. Specifically, the second joint 330 is installed at the lower end of the air intake pipe 300, and the second joint 330 and the second installation port 320 may be fixedly connected by buckle connection, screw connection, etc., which will not be specifically limited here.

Figure 4:
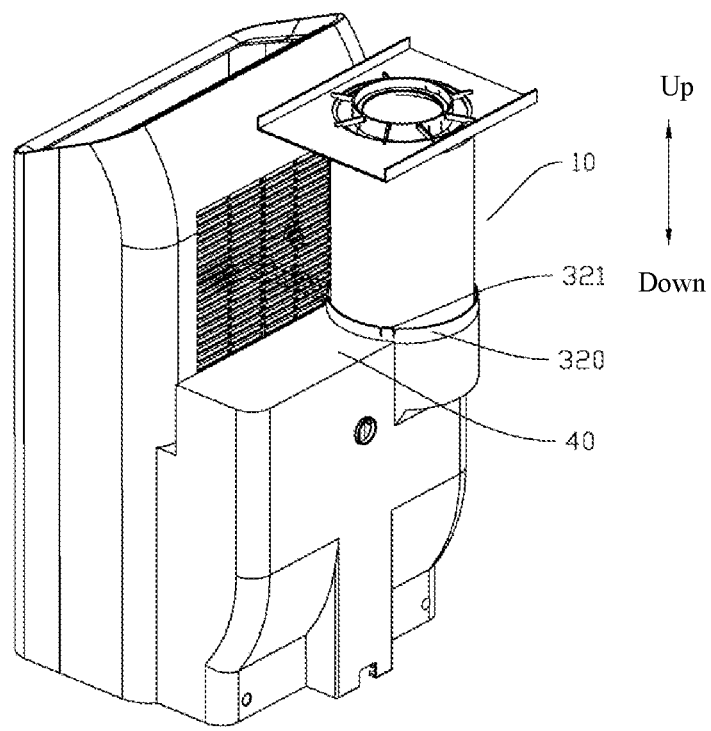
FIG. 4 is a schematic three-dimensional view of a packaged air conditioner according to an embodiment of the present disclosure.

In some embodiments, with reference to FIG. 2 and FIG. 4, the second installation port 320 is provided with a plurality of second buckles 321 at intervals along the circumferential direction, and the plurality of second buckles 321 are clamped with the second joint 330, which is convenient to install and disassemble and has a stable connection structure by using a clamping mechanism. It may be understood that a number of the second buckle 321 may be set to be one, two, three or more than three. When the number of the second buckle 321 is set to be multiple, the multiple second buckles 321 are uniformly distributed on the second installation port 320, and the number of the second buckle 321 may be designed according to different sizes of air intake pipes 300 adopted by the packaged air conditioner in actual production. In addition, the plurality of second buckles 321 may be designed to be clamped with an outer wall of the second joint 330, and may also be designed to be clamped with an inner wall of the second joint 330, and the air inlet 30 may be arranged on a rear panel 40 of the packaged air conditioner and faces upwards, so as to realize sealing assembly of the air intake pipe 300 and the rear panel 40 of the packaged air conditioner to avoid air leakage between the air intake channel 310 and the external environment.

Figure 3:
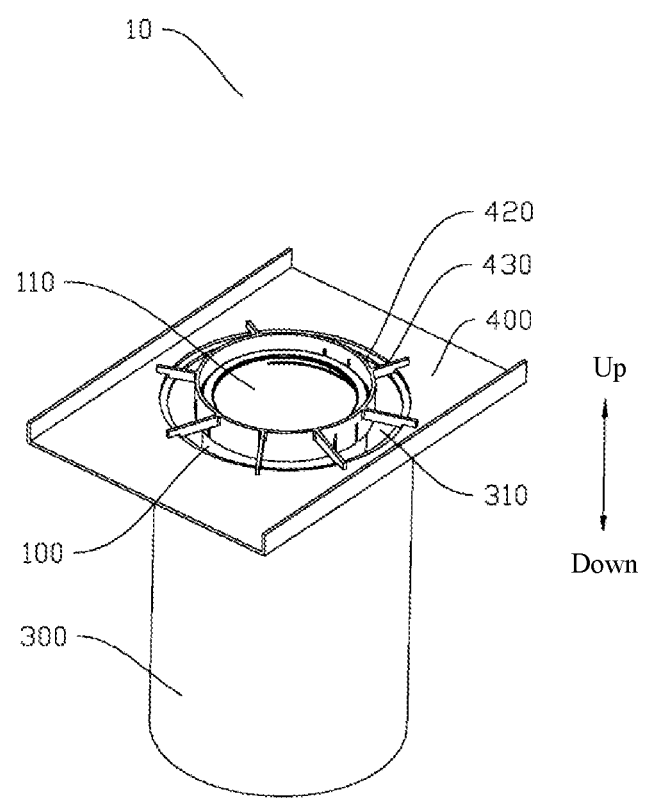
FIG. 3 is a schematic three-dimensional view of an air intake and exhaust assembly according to an embodiment of the present disclosure.

With reference to FIG. 2 and FIG. 3, in some embodiments, a sealing plate 400 is further included, where the sealing plate 400 is provided with an air intake hole 410, and the air intake hole 410 is connected to one end of the air intake pipe 300 away from the air inlet 30, such that the sealing plate 400 is fixedly connected to the air intake pipe 300, such that a user can realize synchronous operation of the air intake pipe 300 by operating the sealing plate 400, which is convenient for the user to stretch and install or contract and fold the air intake pipe 300, and improves a usability of the air intake pipe 300. In addition, it is also convenient for the user to stretch or fold the air exhaust pipe 100 through the air intake hole 410.

In some embodiments, with reference to FIG. 2 and FIG. 3, the sealing plate 400 also includes a fixation ring 420. The fixation ring 420 is arranged in the air intake hole 410 and includes an air exhaust hole 421, the air exhaust hole 421 is connected to one end of the air exhaust pipe 100 away from the air outlet 23, the sealing plate 400 and the fixation ring 420 fix the air intake pipe 300 and the air exhaust pipe 100, respectively, and a connection rib 430 is arranged between the fixation ring 420 and the sealing plate 400, such that the sealing plate 400 and the fixation ring 420 are integrally arranged, such that the user can synchronously stretch and install or contract and fold the air intake pipe 300 and the air exhaust pipe 100 while operating the sealing plate 400, which is convenient for the user to integrally stretch and contract the air intake and exhaust assembly 10, thus improving an efficiency of installation and disassembly of the air intake and exhaust assembly 10 and further improving a usability of the air intake and exhaust assembly 10. It is also noted that the sealing plate 400, the fixation ring 420 and the connection rib 430 may be formed by integral injection molding, which are convenient to process and more stable in structure.

With reference to FIG. 3, in some embodiments, a plurality of connection ribs 430 are provided, and the plurality of connection ribs 430 are arranged at intervals along a circumferential direction of the fixation ring 420, which improves a stability of the connection between the fixation ring 420 and the sealing plate 400, improves a structural strength of the sealing plate 400, and further prolongs a service life of the air intake and exhaust assembly 10.

With reference to FIG. 1 and FIG. 3, in some embodiments, the air exhaust pipe 100, the connection pipe 200 and the air intake pipe 300 are all cylindrical, which are convenient to process, assemble and use. It should be noted that corrugated hoses may be used as the air exhaust pipe 100 and the air intake pipe 300, which have good flexibility, light weight and good durability and are convenient to contract and fold.

With reference to FIG. 4, a packaged air conditioner according to an embodiment of the present disclosure includes the air intake and exhaust assembly 10 according to the above embodiments. According to the packaged air conditioner of this embodiment, a dual-air-pipe structure is formed by arranging the air exhaust pipe 100 and the air intake pipe 300 sleeved the air exhaust pipe 100 in the air intake and exhaust assembly 10, which is simple and aesthetically favorable in structure, is convenient for users to install and adjust the air intake and exhaust assembly 10, and improves the user experience. With reference to FIG. 1, in the packaged air conditioner according to the embodiments of the present disclosure, the air intake channel 310 is formed between the air intake pipe 300 and the air exhaust pipe 100, such that the air intake channel 310 is communicated with the air inlet 30 of the packaged air conditioner to transfer outdoor air to the outdoor heat exchanger 21; the air exhaust channel 110 is formed in the air exhaust pipe 100 and connected to the air exhaust volute 22 through the connection pipe 200, such that the air outlet 23 of the air exhaust volute 22 is communicated with the air exhaust channel 110 to discharge the air after heat exchange outdoors, thereby forming a sealed heat exchange duct and improving the heat exchange effect between the packaged air conditioner and the outdoor environment; and the connection pipe 200 makes the connection between the air exhaust pipe 100 and the air exhaust volute 22 more reliable, improves a sealing performance of the air exhaust channel 110, avoids air crossing between the air intake channel 310 and the air exhaust channel 110, and improves the energy efficiency of the packaged air conditioner.

The embodiments of the present disclosure have been described in detail above with reference to the accompanying drawings, but the present disclosure is not limited to the embodiments described above, and various changes may be made without departing from the spirits of the present disclosure within the scope of knowledge possessed by those of ordinary skill in the art.

The invention claimed is:

1. An air intake and exhaust assembly comprising:
an air exhaust pipe, including an air exhaust channel formed in the air exhaust pipe;
a connection pipe, one end of the connection pipe being connected to a lower end of the air exhaust pipe and another end of the connection pipe being configured to be connected to an air exhaust volute of a packaged air conditioner, such that the air exhaust channel is communicated with an air outlet of the air exhaust volute;
an air intake pipe arranged adjacent to the air exhaust pipe, an air intake channel being formed between an inner wall of the air intake pipe and an outer wall of the air exhaust pipe, and the air intake channel being communicated with an air inlet of the packaged air conditioner; and
a sealing plate including:
an air intake hole connected to one end of the air intake pipe away from the air inlet;
a fixation ring arranged in the air intake hole; and
an air exhaust hole connected to one end of the air exhaust pipe away from the air outlet, wherein the air intake hole surrounds the air exhaust hole, and the fixation ring is between the air intake hole and the air exhaust hole.

2. The air intake and exhaust assembly according to claim 1, wherein the one end of the connection pipe is provided with an installation port, and the lower end of the air exhaust pipe is provided with a joint matching the installation port.

3. The air intake and exhaust assembly according to claim 2, wherein the installation port is provided with a plurality of buckles arranged at intervals along a circumferential direction of the installation port, and the plurality of buckles are clamped with the joint.

4. The air intake and exhaust assembly according to claim 1, wherein the air inlet is provided with an installation port, and one end of the air intake pipe facing the air inlet is provided with a joint matching the installation port.

5. The air intake and exhaust assembly according to claim 4, wherein the installation port is provided with a plurality of buckles arranged at intervals along a circumferential direction of the installation port, and the plurality of buckles are clamped with the joint.

6. The air intake and exhaust assembly according to claim 1, further comprising:
a connection rib arranged between the fixation ring and the sealing plate.

7. The air intake and exhaust assembly according to claim 1, further comprising:
a plurality of connection ribs arranged between the fixation ring and the sealing plate and arranged at intervals along a circumferential direction of the fixation ring.

8. The air intake and exhaust assembly according to claim 1, wherein each of the air exhaust pipe, the connection pipe, and the air intake pipe is cylindrical.

9. A packaged air conditioner comprising:
an air exhaust volute; and
an air intake and exhaust assembly including:
an air exhaust pipe, including an air exhaust channel formed in the air exhaust pipe;
a connection pipe, one end of the connection pipe being connected to a lower end of the air exhaust pipe and another end of the connection pipe being configured to be connected to the air exhaust volute, such that the air exhaust channel is communicated with an air outlet of the air exhaust volute;
an air intake pipe arranged adjacent to the air exhaust pipe, an air intake channel being formed between an inner wall of the air intake pipe and an outer wall of the air exhaust pipe, and the air intake channel being communicated with an air inlet of the packaged air conditioner; and a sealing plate including:
  an air intake hole connected to one end of the air intake pipe away from the air inlet;
  a fixation ring arranged in the air intake hole; and
  an air exhaust hole connected to one end of the air exhaust pipe away from the air outlet, wherein the air intake hole surrounds the air exhaust hole, and the fixation ring is between the air intake hole and the air exhaust hole.

10. The packaged air conditioner according to claim 9, wherein the one end of the connection pipe is provided with an installation port, and the lower end of the air exhaust pipe is provided with a joint matching the installation port.

11. The packaged air conditioner according to claim 10, wherein the installation port is provided with a plurality of buckles arranged at intervals along a circumferential direction of the installation port, and the plurality of buckles are clamped with the joint.

12. The packaged air conditioner according to claim 9, wherein the air inlet is provided with an installation port, and one end of the air intake pipe facing the air inlet is provided with a joint matching the installation port.

13. The packaged air conditioner according to claim 12, wherein the installation port is provided with a plurality of buckles arranged at intervals along a circumferential direction of the installation port, and the plurality of buckles are clamped with the joint.

14. The packaged air conditioner according to claim 9, wherein the air intake and exhaust assembly further includes:
  a connection rib arranged between the fixation ring and the sealing plate.

15. The packaged air conditioner according to claim 9, wherein the air intake and exhaust assembly further includes:
  a plurality of connection ribs arranged between the fixation ring and the sealing plate and arranged at intervals along a circumferential direction of the fixation ring.

16. The packaged air conditioner according to claim 9, wherein each of the air exhaust pipe, the connection pipe, and the air intake pipe is cylindrical.

\* \* \* \* \*